(12) United States Patent
Yamane et al.

(10) Patent No.: US 6,188,073 B1
(45) Date of Patent: *Feb. 13, 2001

(54) RADIOGRAPHIC INTENSIFYING SCREEN

(75) Inventors: Katsutoshi Yamane; Hisao Arai, both of Kanagawa (JP)

(73) Assignee: Fuji Photo Film Co., Ltd., Minami-ashigara (JP)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/100,466

(22) Filed: Jun. 19, 1998

(30) Foreign Application Priority Data

Jun. 19, 1997 (JP) .................................. 9-180668
Mar. 31, 1998 (JP) .................................. 10-105570

(51) Int. Cl.[7] ...................................... G21K 4/00
(52) U.S. Cl. ...................................... 250/483.1
(58) Field of Search .............. 290/483.1, 488.1, 290/487.1, 581, 361 R, 367, 361 C

(56) References Cited

U.S. PATENT DOCUMENTS

| | | |
|---|---|---|
| 4,059,768 | 11/1977 | Van Landeghem et al. . |
| 4,149,083 | 4/1979 | Suys et al. . |
| 4,979,200 * | 12/1990 | Umemoto et al. ............... 378/185 |
| 5,145,743 * | 9/1992 | Beutel et al. ............... 428/403 |
| 5,475,229 * | 12/1995 | Itabashi et al. ............... 250/483.1 |
| 5,925,473 * | 7/1999 | Kuriyama et al. ............... 428/690 |

FOREIGN PATENT DOCUMENTS

| | | |
|---|---|---|
| 311831 | 5/1919 | (DE) . |
| 62137599 | 6/1987 | (JP) . |
| 328798 | 2/1991 | (JP) . |

OTHER PUBLICATIONS

Patent Abstracts of Japan, vol. 016, no. 056 (P–1310), 12 Feb. 1992 & JP 03 255400 A, (KONICA CORP), Nov. 14, 1991.

DATABASE WPI, Section Ch, Week 8320, Derwent Publications Ltd., London , GB; Class G06, AN 83–47623K, XP002076520 JP 58 058 500A (TOKYO SHIBAURA ELECTRIC CO) *abstract*.

DATABASE WPI, Section Ch, Week 8050, Derwent Publication Ltd.., London, GB; Class E33, AN 80–89392C, Xp002076521 & JP 55 045 598B (TOKYO SHIBAURA ELECTRIC CO) *abstract*.

* cited by examiner

*Primary Examiner*—Constantine Hannaher
*Assistant Examiner*—Albert Gagliardi
(74) *Attorney, Agent, or Firm*—Birch, Stewart, Kolasch & Birch, LLP

(57) ABSTRACT

A radiographic intensifying screen is composed of a support, a phosphor layer containing phosphor and a surface protective layer overlaid in order. The surface protective layer shows a scattering length of 5 to 80 $\mu$m, in which the scattering length is measured at main wavelength of light emitted from the phosphor.

13 Claims, No Drawings

RADIOGRAPHIC INTENSIFYING SCREEN

FIELD OF THE INVENTION

The present invention relates to a radiographic intensifying screen employable for radiography.

BACKGROUND OF THE INVENTION

In a variety of radiography such as medical radiography for diagnosis, a radiographic intensifying screen is generally used in combination with a radiographic film. The radiographic intensifying screen generally comprises a support, a phosphor layer and a surface protective layer overlaid in order. Since the surface protective layer is provided to keep the phosphor layer from chemical and physical deterioration, the protective layer must have a thickness enough to protect the phosphor layer. However, if the surface protective layer is too thick, the sensitivity lowers and further the resultant image is liable to shows poor sharpness. In order to solve this problem, many studies have been done.

In a generally employable radiographic intensifying screen, a typical material for the surface protective layer is a polyethylene terephthalate film having a haze of 5 to 10.

German Patent Publication No. 3,111,831 discloses a surface protective layer containing γ-alumina particles in an amount of less than 0.1 wt. %.

Japanese Patent Publication No. 60-34720 discloses a surface protective layer wherein an organic matting agent is introduced to improve slip property of its surface.

Japanese Patent Provisional Publication No. 62-137599 discloses a surface protective layer in which polymer fine particles are introduced so as to improve slip property of its surface.

Japanese Patent Provisional Publication No. H3-28798 discloses a radiographic intensifying screen which comprises a protective layer having a great number of very small convexes or concaves on its surface.

Japanese Patent Provisional Publication No. 51-127688 discloses a radiographic intensifying screen which comprises a protective layer having a great number of very small convexes of matting agent.

Japanese Patent Provisional Publication No. 53-66392 discloses that a light-scattering layer is provided between the phosphor layer and a silver halide emulsion layer so that production of black spots by radioactive isotope can be prevented.

Japanese Patent Provisional Publication No. 58-58500 discloses a radiographic intensifying screen which has a white light-scattering layer provided on the phosphor layer, and a transparent protective layer provided on the light-scattering layer.

Japanese Patent Provisional Publication No. H3-255400 discloses a radiographic intensifying screen in which metal oxides are provided between the phosphor layer and the surface protective layer so that the screen can have electro-conductivity.

The known surface protective layers such as described above have been developed in consideration of protection against chemical and physical deterioration (e.g., scratch resistance, stain resistance and abrasion resistance), as well as sharpness of the resultant radiation image. However, although these known surface protective layers are improved to a certain extent, their properties are still unsatisfactory.

SUMMARY OF THE INVENTION

It is an object of the present invention to provide a radiographic intensifying screen which has good surface durability such as high stain resistance and high abrasion resistance and which gives a radiation image of high sharpness with high sensitivity.

The present invention resides in a radiographic intensifying screen comprising a support, a phosphor layer containing phosphor and a surface protective layer over-laid in order, wherein the surface protective layer shows a scattering length in the range of 5 to 80 μm, said scattering length being measured at main wavelength of light emitted from the phosphor.

The scattering length is used to mean an average distance in which light travels straight until it is scattered, and hence a small value means that the light is highly scattered. In accordance with Kubeluka-Munk theory, the scattering length can be calculated from the date obtained in the following measurement.

First, three film samples are prepared. All film samples have a thickness differing from each other, but each consists of the same components as the target surface protective layer. The thickness (μm) and the diffuse transmittance (%) of each sample are then measured. The diffuse transmittance (%) can be measured by means of a spectrophotometer equipped with an integrating sphere. In the below-described examples of the present specification, an automatic recording spectrophotometer (U-3210, manufactured by HITACHI, Ltd.) equipped with an integrating sphere of 150 φ (150–0910) was used. The diffuse transmittance must be measured at a wavelength corresponding to the main peak of the luminescence (light) emitted from phosphor contained in the phosphor layer on which the target surface protective layer is provided.

From the thickness (μm) and the diffuse transmittance (%) obtained in the above measurement, the scattering length is calculated in accordance with the following formula (A) derived from Kubeluka-Munk theory. The following formula (A) can be easily derived, under the boundary condition giving the diffuse transmittance (%), from the formulas 5.1.12 to 5.1.15 described in "Keikotai Handbook [Japanese, Handbook of Phosphor]", published by Ohm-sha, 1987, pp.403.

Formula (A):

$$T/100 = 4\beta/[(1+\beta)^2 \cdot \exp(\alpha d) - (1-\beta)^2 \cdot \exp(-\alpha d)]$$

in which T represents the diffuse transmittance (%), d represents the thickness (μm), and α and β are defined by the formulas: $\alpha = [K \cdot (K+2S)]^{1/2}$ and $\beta = [K/(K+2S)]^{1/2}$, respectively.

The formula (A) is applied to the measured T (diffuse transmittance) and d (thickness) of each film sample, and thereby the values of K and S are determined. The scattering length (μm) and the absorption length (μm) described below are values defined by 1/S and 1/K, respectively.

Preferred embodiments of the present invention are as follows.

(1) The scattering length is in the range of 10 to 70 μm, particularly 10 to 60 μm.

(2) The surface protective layer contains light-scattering fine particles having a grain size of 0.1 to 1 μm and s refractive index of more than 1.6.

(3) The surface protective layer contains light-scattering fine particles having s grain size of 0.1 to 1 μm and a refractive index of not less than 1.9.

(4) The surface protective layer contains light-scattering fine particles comprising at least one material selected from the group consisting of zinc oxide, zinc sulfide, titanium dioxide (particularly, anatase type titanium dioxide), and lead carbonate; and the particles have a mean grain size of 0.1 to 1 μm.

(5) The surface protective layer comprises a binder containing fluorocarbon resin or polyester resin and light-scattering fine particles dispersed therein.

(6) The surface protective layer has the thickness of 2 to 12 μm, particularly 3 to 9 μm.

(7) The phosphor contained in the phosphor layer is represented by the following formula:

$$M_2O_2X:Tb$$

in which M is at least one element selected from the group consisting of Y, Gd and Lu; and X is at least one element selected from the group consisting of S, Se and Te.

(8) The phosphor layer exhibits a scattering length of 5 to 50 μm, particularly 7 to 30 μm.

(9) A light-reflecting layer is provided between the support and the phosphor layer.

(10) The phosphor layer comprises a binder and the phosphor dispersed therein, and the weight ratio of the binder to the phosphor is in the range of 1/12 to 1/200, particularly 1/16 to 1/100.

DETAILED DESCRIPTION OF THE INVENTION

The radiographic intensifying screen of the invention is now described in detail.

The radiographic intensifying screen of the invention has the same structure as the known intensifying screen comprising a support, a phosphor layer and a surface protective layer overlaid in this order.

The support employed in the invention can be optionally selected from those employed in the conventional radiographic intensifying screens. Examples of the support include polymer films containing white pigment (e.g., titanium oxide) or black pigment (e.g., carbon black).

The phosphor layer may be directly provided on the top face of the support. Otherwise, the phosphor layer may be provided via a subbing layer containing light-reflecting material (i.e., light-reflecting layer). The light-reflecting layer generally comprises a polymer binder and a white pigment (e.g., titanium dioxide) dispersed therein.

A variety of phosphors employable for a radiographic intensifying screen are known, and any of them can be used in the invention. Examples of the phosphor employable for the invention include $CaWO_4$, $YTaO_4$, $YTaO_4:Nb$, LaOBr:Tm, $BaSO_4:Pb$, ZnS:Ag, $BaSO_4:Eu$, $YTaO_4:Tm$, BaFCl:Eu, BaF(Br,I):Eu, $Gd_2O_2S:Tb$, $Y_2O_2S:Tb$, $La_2O_2S:Tb$, $(Y, Gd)_2O_2S:Tb$ and $(Y,Gd)_2O_2S:Tb,Tm$. Those phosphors may be used singly or in combination.

Preferred are terbium activated rare earth oxychalcogenide phosphors represented by the formula: $M_2O_2X:Tb$ (in which M is at least one element selected from the group consisting of Y, Gd and Lu, and X is at least one element selected from the group consisting of S, Se and Te). Terbium activated rare earth oxysulfide phosphors are more preferred. Examples of the preferred phosphors include $Gd_2O_2S:Tb$, $Y_2O_2S:Tb$, $La_2O_2S:Tb$, $(Y,Gd)_2O_2S:Tb$, and $(Y,Gd)_2O_2S:Tb,Tm$. U.S. Pat. No. 3,725,704 describes in detail the terbium activated rare earth oxysulfide phosphors. The phosphor represented by $Gd_2O_2S:Tb$ is particularly preferred for the present invention.

The phosphor layer can be formed by the steps of dispersing the phosphor particles in an organic solution of binder resin to prepare a coating liquid, applying the liquid onto the support directly or via the subbing layer such as light-reflecting layer, and then drying the applied liquid to form the phosphor layer. The phosphor layer may be formed by other steps, namely, applying the above coating liquid onto a temporary support, drying the applied liquid to form a phosphor sheet, peeling off the phosphor sheet from the temporary support, and then providing the phosphor sheet with adhesive onto the support directly or via a subbing layer. The binder resins, organic solvents, and other optional additives employable for the above procedures are described in a variety of known publications.

The weight ratio of the binder (total amount of organic compounds contained in the phosphor layer) to the phosphor is not restricted, but the present invention is very effective in the phosphor layer containing a small amount of binder. Accordingly, the preferred ratio of binder/phosphor is in the range of 1/12 to 1/200, more preferably 1/16 to 1/100, and particularly preferably 1/22 to 1/100.

The thickness of the phosphor layer can be desirably set according to the target sensitivity. In the case that the intensifying screen is placed in front of the radiographic film, the thickness preferably is in the range of 70 to 150 μm. On the other hand, the screen placed behind the film preferably has a thickness of 80 to 400 μm. The volume filling content of the phosphor in the phosphor layer is preferably in the range of 60 to 85%, more preferably 65 to 80%, and particularly preferably 68 to 75%. The X-ray absorption of the phosphor layer depends on the content of the phosphor particles.

On the phosphor layer, the surface protective layer characterizing the present invention is formed. The surface protective layer exhibits a scattering length of 5 to 80 μm which is measured at the main wavelength of the luminescence emitted from the phosphor contained in the phosphor layer. The scattering length preferably is in the range of 10 to 70 μm, more preferably 10 to 60 μm. The surface protective layer preferably contains dispersed light-scattering fine particles having a mean grain size of 0.1 to 1 μm and the refractive index of not less than 1.6. The refractive index preferably is not less than 1.9. Examples of the light-scattering fine particles include fine particles of magnesium oxide, zinc oxide, zinc sulfide, titanium dioxide, niobium oxide, barium sulfate, lead carbonate, silicon oxide, poly(methyl methacrylate), polystyrene, and melamine resin. Zinc oxide, zinc sulfide, titanium dioxide and lead carbonate are preferred. Titanium dioxide is particularly preferred.

The binder employable for the surface protective layer is not restricted, but it is required for the binder to keep the surface durability such as stain resistance and abrasion resistance even if the light-scattering fine particles are introduced. In consideration of this, following materials are preferably employable as the binder. Examples of the binders include polyethylene terephthalate, polyethylene naphthalate, polyethylene, polyvinylidene chloride, polyamide, aramide, a solvent-soluble fluorocarbon resin, cellulose derivatives (e.g., cellulose acetate, nitrocellulose, and cellulose acetate butyrate), polyvinyl chloride, polyvinyl acetate, vinyl chloride-vinyl acetate copolymer, polycarbonte, polyvinyl butyral, poly(methyl methacrylate), polyvinyl formal, and polyurethane. More preferred are fluorocarbon resin, cellulose derivatives, and biaxial oriented polymers such as polyethylene terephthalate, polyethylene naphthalate, polyamide and aramide. Particularly preferred are fluorocarbon resin, biaxial oriented polyethylene terephthalate and biaxial oriented polyethylene naphthalate. The binder employable for the invention is by no means restricted by those examples.

The surface protective layer can be formed by the steps of dispersing the above light-scattering particles in an organic solution of the binder resin to prepare a coating liquid, applying the liquid onto the phosphor layer directly or via a desired auxiliary layer, and then drying the applied liquid to form the protective layer. The surface protective layer may be formed by other steps, namely, applying the above coating liquid onto a temporary support, drying the applied liquid to form a protective sheet, peeling off the protective sheet from the temporary support, and then providing the protective sheet with adhesive onto the phosphor layer directly or via a desired auxiliary layer. The surface protective layer may contain known additives such as an antistatic agent.

The thickness of the surface protective layer is not restricted, but the layer having a thickness of less than 2 μm can not keep satisfactory surface durability. On the other hand, if the thickness is more than 12 μm, the resultant image exhibits unsatisfactory sharpness although it is improved as compared with the image given by a conventional screen having a protective layer of the same thickness. Accordingly, the thickness of the surface protective layer preferably is in the range of 2 to 12 μm, more preferably 3 to 9 μm, and particularly preferably 4 to 9 μm.

The absorption length (which indicates a mean distance in which light travels straight until it is absorbed) of the surface protective layer is not restricted. From the viewpoint of sensitivity of the screen, it is preferred for the protective layer not to absorb light. However, in order to make up for shortage of the scattering, the surface protective layer may be made to slightly absorb the light. The absorption length preferably is more than 800 μm, more preferably more than 1,200 μm.

General descriptions of the process for preparation of a radiographic intensifying screen and the materials employable for performing the process are given in detail in Japanese Patent Provisional Publications No. H9-21899 and No. H8-184946.

A radiographic intensifying screen is generally used in combination with a radiographic film employing silver halide photosensitive material. The radiographic film used together with the radiographic intensifying screen of the invention is now described below.

Any kinds of radiographic films can be used together with the screen of the invention, but a "both-sided emulsion film" is preferred. The "both-sided" radiographic film comprises a silver halide emulsion layers provided on both faces of the support. The light cross-over of the film preferably is less than 15 %, more preferably less than 10 %, particularly preferably in the range of 3 to 7 %. The radiographic film showing a low light cross-over can be produced by providing a cross-over shielding layer between the emulsion layer and the support, and is commercially available from Fuji Photo film Co., Ltd. (e.g., UR-1, UR-2, UR-3, Super HRS 30, Super L 30, Super G 30, Super $C_{30,}$ and Super A 30 [trade names]).

The cross-over shielding layer contains a dye selected in consideration of its sensitive wavelength. Any kinds of dye can be used unless it causes disturbing absorption after development. The dye is preferably used in the form of dispersed fine solid particles in accordance with, for example, Japanese Patent Provisional Publications No. H2-264936, No. H3-210553, No. H3-210554, No. H3-238447, No. H4-14038, No. H4-14039, No. H4-125635, No. H4-338747 and No. H6-27589. Examples of the dye include dyes represented by the formulas (I) to (VII) and the compounds (I-1) to (I-37), (II-1) to (II-6), (III-1) to (III-36), (IV-1) to (IV-16), (V-1) to (V-6), (VI-1) to (VI-13) and (VII-1) to (VII-5) in Japanese Patent Provisional Publication No. H4-211542; dyes represented by the formula (1) in Japanese Patent Provisional Publication No. H8-73767; and dyes represented by the formulas (VIII) to (XII) and the compounds (VIII-1) to (VIII-5), (IX-1) to (IX-10), (X-1) to (X-21), (XI-1) to (XI-6) and (XII-1) to (XII-7) in Japanese Patent Provisional Publication No. H8-87091.

The dye may be added by known methods such as the method in which the dye is adsorbed onto mordant, the method in which the dye is dissolved in oil to give an emulsion, the method in which the dye is adsorbed onto surface of an inorganic compound (method described in Japanese Patent Provisional Publication No. H3-5748), and the method in which the dye is adsorbed onto polymer material (method described in Japanese Patent Provisional Publication No. H2-298939).

The crossover-shielding layer can be formed on the radiographic film in the known manner described in the above publications.

Examples of the radiographic film and its materials preferably employable in combination with the intensifying screen of the invention are as follows.

1) The radiographic film described in Example 1 of Japanese Patent Provisional Publication No. H6-332088, and the radiographic films described in Examples 1 and 2 of Japanese Patent Provisional Publication No. H7-219162.

2) The emulsion of tabular silver chloride having {100} principal plane described in Examples 3 and 4 of Japanese Patent Provisional Publication No. H5-204073, that described in Example 2a of Japanese Patent Provisional Publication No. H6-194768, and that described in Example 1 of Japanese Patent Provisional Publication No. H6-227431.

3) The photosensitive silver iodobromide, silver bromide and silver bromide chloride particles having {111} principal plane described in Example 1 of Japanese Patent Provisional Publication No. H8-76305, and the emulsions described in Examples A to K of Japanese Patent Provisional Publication No. H8-69069.

4) The mono-dispersed cubic particles (whose dispersion degree is preferably in the range of 3 to 40% in terms of variation coefficient of projected area diameters) described in Example 1 of Japanese Patent Provisional Publication No. H8-76305.

In addition, preferred radiographic films and their materials are described in detail in Japanese Patent Provisional Publication No. H6-67305.

A radiographic film can be used in combination with a single intensifying screen, but usually a "both-sided emulsion type" radiographic film described above is used in combination with two intensifying screens placed on both faces of the film. The intensifying screen placed in front of the radiographic film is generally called "front screen", and that placed behind the film is called "back screen".

EXAMPLE 1

(I) Production of Radiographic Intensifying Screen
1) Preparation of a support having light-reflecting layer containing titanium dioxide A rutile type titanium dioxide powder (500 g) having the mean grain size of 0.28 μm (CR 95 [trade name], available from Ishihara Industries, Co., Ltd.) and 100 g of acrylic binder resin (Cryscoat P1018GS [trade name], available from Dainippon Ink & Chemicals, Inc.) were added into methyl ethyl ketone, and mixed to prepare a coating liquid having a viscosity of 10 PS. The coating liquid was then evenly applied by means of a doctor blade onto a polyethylene terephthalate film (thickness: 250 μm) containing a titanium dioxide powder, and then dried to give a light-reflecting layer. The thickness of the dried light-reflecting layer was 40 μm. The volume filling (packing) content of titanium dioxide in the support having the light-reflecting layer was 48 %, and the diffuse reflectance at a wavelength of 545 nm (which corresponds to the main peak of the luminescence emitted from terbium activated gadolinium oxysulfide $Gd_2O_2S$:Tb phosphor) was 95.5%.

2) Preparation of a phosphor sheet

Terbium activated gadolinium oxysulfide ($Gd_2O_2S$:Tb, mean grain size: 3.5μm, 250 g), 8 g of polyurethane binder resin (Pandex T5265M [trade name], available from Dainippon Ink & Chemicals, Inc.), 2 g of epoxy binder resin (Epikote 1001 [trade name], available from Yuka Shell Epoxy Kabushiki Kaisha) and 0.5 g of isocyanate compound (Colonate HX [trade name], available from Nippon Polyurethane Kogyo Kabushiki Kaisha) were added into methyl ethyl ketone, and mixed using a propeller mixer to prepare a coating liquid having a viscosity of 25 PS (at 25° C). The coating liquid was then applied onto a temporary support (polyethylene terephthalate sheet having a surface beforehand coated with a silicon releasing agent), and dried to give a phosphor layer. The phosphor layer was then peeled off from the temporary support to prepare a phosphor sheet.

3) Fixing the phosphor sheet onto the support

The above-prepared phosphor sheet was placed on the support prepared in the above 1), and then pressed by means of a calender roll at a pressure of 400 kgw/cm² at 80° C. The thickness of the resultant phosphor layer was 105 μm. The volume filling content of the phosphor and the weight ratio of binder/phosphor in the phosphor layer were 68 % and 1/24, respectively.

4) Preparation of a surface protective layer

Fluorocarbon resin (Lumiflon LF100 [trade name], available from Asahi Glass Co., Ltd., 10 g), 0.5 g of an alcohol modified-siloxane oligomer (X-22-2809 [trade name], available from The Shin-Etsu Chemical Co., Ltd.), 3.2 g of isocyanate (Orestar NP38-70s [trade name], available from Mitsui Toatsu Chemicals, Inc.), 0.4 g of anatase type titanium dioxide (A220 [trade name], available from Ishihara Industries Co., Ltd.; mean grain size: 0.15 μm; refractive index: about 2.6) and 0.001 g of a catalyst (KS1269 [trade name], available from Kyodo Chemical Co., Ltd.) are added into a mixed solvent of methyl ethyl ketone and cyclohexanone (weight ratio: 1/1), and mixed to prepare a coating liquid. The coating liquid was then applied onto the phosphor layer by means of a doctor blade, and slowly dried. The coated layer was then heated at 120° C. for 30 minutes to form a surface protective layer (thickness: 7 μm). The content of titanium dioxide in the surface protective layer was 3 wt. %.

(II) Calculation of the scattering length and the absorption length of the surface protective layer The coating solution of the above 4) was applied onto a transparent support (thickness: 180 μm) so that the formed layer would have a thickness of 5 to 50 μm.

The diffuse transmittance (or diffused transmittance: %) of the formed layer was measured at a wavelength of 545 nm (corresponding to the main peak of the luminescence emitted from terbium activated gadolinium oxysulfide $Gd_2O_2S$:Tb phosphor), by means of an automatic recording spectrophotometer (U-3210, manufactured by HITACHI, Ltd.) equipped with an integrating sphere of 150 φ (150-0910). The results are set forth in Table 1.

TABLE 1

| thickness (μm) | 7 | 11 | 24 | 40 |
|---|---|---|---|---|
| diffuse transmittance (%) | 70.3 | 62.6 | 48.4 | 40.2 |

In accordance with the above-described formulas, the values of K and S were calculated from the data shown in Table 1. From the calculated values of K and S, the scattering length and the absorption length were determined to be 23 μm (scattering length=1/S) and 10,000 μm (absorption length=1/K), respectively.

COMPARISON EXAMPLE 1

The procedure of Example 1 was repeated except that titanium dioxide was not added to the surface protective layer, to prepare a radiographic intensifying screen. The scattering length of the prepared screen was then determined in the same manner as described above, and found to be more than 200 μm.

COMPARISON EXAMPLE 2

The procedure of Example 1 was repeated except that the content of titanium dioxide powder in the surface protective layer was set to be 0.1 wt. %, to prepare a radiographic intensifying screen. The scattering length of the prepared screen was determined in the same manner as described above, and found to be 140 μm.

EXAMPLE 2

The procedure of Example 1 was repeated except that the content of titanium dioxide powder in the protective layer was set to be 1 wt. %, to prepare a radiographic intensifying screen. The scattering length of the prepared screen was determined, and found to be 50 μm.

EXAMPLE 3

The procedure of Example 1 was repeated except that the content of titanium dioxide powder in the protective layer was set to be 10 wt. %, to prepare a radiographic intensifying screen. The scattering length of the prepared screen was determined, and found to be 9 μm.

[Measurement of Sharpness and Sensitivity]

(1) Measurement of sharpness

On the surface protective layer of the sample intensifying screen, a "single emulsion layer type" radio-graphic film (X-ray film MINP 30 [trade name], available from Fuji Photo film Co., Ltd.) was overlaid so that the film might be directly contact with the protective layer. (A "single emulsion layer type" radiographic film comprises a silver halide emulsion layer provided on only one surface of its support.) The combination of the screen and the X-ray film was then exposed to X-rays through an CTF chart (made of molybdenum, thickness: 80 Am, space frequency: 0 to 10 lines/mm) in the following manner.

The CTF chart was placed at a distance of 2 m from an X-ray source, and the X-ray film and the screen were placed behind the CTF chart in order. The X-ray source was composed of an X-ray generating apparatus and filters. The X-ray generating apparatus (DRX-3724HD [trade name], available from Toshiba Corporation; focal spot size: 0.6 mm×0.6 mm) equipped with a tungsten target and an aluminum filter (thickness: 3 mm) was activated with a three-phase pulse generator under 80 kvp, to generate X-rays. The generated X-rays were made to pass a water filter (thickness:

7 cm), which absorbed X-rays in the same amount as a human body, and then emitted from the X-ray source. After the exposure was made, the exposed film was developed in an automatic developing machine (FPM-5000 [trade name], available from Fuji Photo film Co., Ltd.) using a developer and a fixer (RD-3 and Fuji-F [trade name], respectively; available from Fuji Photo film Co., Ltd.) to obtain a sample for the measurement of sharpness. In the above exposure, the exposing conditions were adjusted so that the thick part of the resultant image would have a density of 1.8.

In accordance with the method described in Japanese Patent Provisional Publication No. H9-21899, the sharpness was determined with the value at 2 lines/mm based on the obtained sample. The results are shown in Table 2.

(2) Measurement of sensitivity

Using the same X-ray source and the same X-ray film as described above, the combination of the screen and the X-ray film was exposed to X-rays. The distance between the X-ray source and the X-ray film was varied so that the amount of exposed X-ray might be stepwise changed (step width: logE=0.15). The exposed film was then developed in the same manner as described above to prepare a sample for the measurement of sensitivity. The density of the sample was measured with visible light to determine a characteristic curve. The sensitivity was determined with a reciprocal of the amount of exposed X-ray giving a fog density of 1.0. The sensitivity thus obtained was relatively shown so that the value of Comparison Example 1 would be 100. The results are set forth in Table 2.

TABLE 2

| screen | scattering length ($\mu$m) | sensitivity | sharpness (2 lines/mm) |
|---|---|---|---|
| C. Ex. 1 | above 200 | 100 | 0.590 |
| C. Ex. 2 | 140 | 100 | 0.590 |
| Ex. 1 | 23 | 99 | 0.630 |
| Ex. 2 | 50 | 100 | 0.625 |
| Ex. 3 | 9 | 97 | 0.615 |

The results shown in Table 2 indicate that each of the radiographic intensifying screens of the invention (Examples 1 to 3) gives a radiographic image having improved sharpness without lowering the sensitivity, as compared with those given by the screens of Comparison Examples 1 and 2.

EXAMPLE 4

The procedure of Example 1 was repeated except that melamine resin particles (refractive index: 1.57, mean grain size: 0.6 $\mu$m, content: 20 wt. %) were used in place of the titanium dioxide powder in the surface protective layer, to prepare a radiographic intensifying screen. The scattering length of the screen was determined and found to be 26 $\mu$m.

EXAMPLE 5

The procedure of Example 1 was repeated except that melamine resin particles (refractive index: 1.57, mean grain size: 0.6 $\mu$m, content: 10 wt. %) were used in place of the titanium dioxide powder in the surface protective layer, to prepare a radiographic intensifying screen. The scattering length of the prepared screen was measured, and found to be 60 $\mu$m.

COMPARISON EXAMPLE 3

The procedure of Example 1 was repeated except that melamine resin particles (refractive index: 1.57, mean grain size: 3 $\mu$m, content: 10 wt. %) were used in place of the titanium dioxide powder in the surface protective layer, to prepare a radiographic intensifying screen. The scattering length of the prepared screen was measured, and found to be 90 $\mu$m.

COMPARISON EXAMPLE 4

The procedure of Example 1 was repeated except that silicon dioxide particles (refractive index: about 1.46, mean grain size: 3 $\mu$m, content: 10 wt. %) were used in place of the titanium dioxide powder n the surface protective layer, to prepare a radiographic intensifying screen. The scattering length of the prepared screen was determined, and found to be 120 $\mu$m.

COMPARISON EXAMPLE 5

The procedure of Example 1 was repeated except that alumina particles (refractive index: about 1.56, mean grain size: 0.8 $\mu$m, content: 5 wt. %) were used in place of the titanium dioxide powder in the surface protective layer, to prepare a radiographic intensifying screen. The scattering length of the prepared screen was measured, and found to be 100 $\mu$m.

Measurement of Sharpness and Sensitivity (1) Measurement of sharpness

The sharpness was measured in the same manner as described above.

(2) Measurement of sensitivity

The sensitivity was measured in the same manner as described above.

The results are set forth in Table 3.

TABLE 3

| screen | scattering length ($\mu$m) | sensitivity | sharpness (2 lines/mm) |
|---|---|---|---|
| C. Ex. 1 | above 200 | 100 | 0.590 |
| C. Ex. 3 | 90 | 100 | 0.600 |
| C. Ex. 4 | 120 | 100 | 0.590 |
| C. Ex. 5 | 100 | 100 | 0.595 |
| Ex. 4 | 26 | 100 | 0.630 |
| Ex. 5 | 60 | 100 | 0.620 |

The results shown in Table 3 indicate that each of the radiographic intensifying screens of the invention (Examples 4 and 5) gives a radiographic image having improved sharpness without lowering the sensitivity, as compared with those given by the screens of Comparison Examples 1 and 3 to 5.

EXAMPLE 6

The procedure of Example 1 was repeated except that only polyethylene terephthalate was used as the binder resin to form a surface protective layer having a thickness of 6 $\mu$m, to prepare a radiographic intensifying screen. The scattering length of the prepared screen was measured, and found to be 30 $\mu$m.

COMPARISON EXAMPLE 6

The procedure of Example 1 was repeated except that only polyethylene terephthalate was used as the binder polymer and the titanium dioxide powder was not used to form a surface protective layer having a thickness of 6 $\mu$m, to prepare a radiographic intensifying screen. The scattering length of the prepared screen was measured, and found to be more than 200 $\mu$m.

Measurement of Sharpness, Sensitivity and Durability (1) Measurement of sharpness The sharpness was measured in the same manner as described above.

(2) Measurement of sensitivity

The sensitivity was measured in the same manner as described above.

(3) Measurement of durability

The durability of the surface protective layer was measured in the following manner.

A great number of beads (diameter: 300 μm) were sprinkled on a plate, and the sample intensifying screen was placed and fixed on the plate so that the support would be in contact with the beads and the surface protective layer would be pressed with the beads via the support to form a great number of convexes on the protective layer. On the surface protective layer having the convexes thus formed, a stainless steel plate (size: 4 cm×5 cm) and a weight of 100 g were placed and repeatedly moved so that the protective layer would be rubbed with the stainless steel plate. The rubbing had been continued until the protective layer produced crack and the phosphor layer was bared, and the times of the rubbing was counted. According to the counted rubbing times, the durability of the surface protective layer was determined. Needless to say, a large number indicates better durability.

The results are set forth in Table 4.

Table 4

TABLE 4

| screen | scattering length (μm) | sensi- tivity | sharpness (2 lines/mm) | dura- bility |
|---|---|---|---|---|
| C. Ex. 6 | above 200 | 98 | 0.595 | above 10000 |
| Ex. 6 | 30 | 97 | 0.635 | above 10000 |

The results shown in Table 4 indicate that the radiographic intensifying screen of the invention gives a radiographic image having improved sharpness without lowering the sensitivity, as compared with those given by the screens of Comparison Example. Further, the results also indicate that polyethylene terephthalate binder resin gives extremely high durability to the surface protective layer.

EXAMPLE 7

The procedure of Example 1 was repeated except that the thickness of the surface protective layer was set at 3 μm, to prepare a radiographic intensifying screen. The scattering length of the prepared screen was measured, and found to be 23 μm.

EXAMPLE 8

The procedure of Example 1 was repeated except that the thickness of the surface protective layer was set at 5 μm, to prepare a radiographic intensifying screen. The scattering length of the prepared screen was measured, and found to be 23 μm.

EXAMPLE 9

The procedure of Example 1 was repeated except that the thickness of the surface protective layer was set at 10 μm, to prepare a radiographic intensifying screen. The scattering length of the prepared screen was measured, and found to be 23 μm.

Measurement of Sharpness and Sensitivity (1) Measurement of sharpness

The sharpness was measured in the same manner as described above.

(2) Measurement of sensitivity

The sensitivity was measured in the same manner as described above.

The results are set forth in Table 5.

TABLE 5

| screen | thick- ness (μm) | scattering length (μm) | sensi- tivity | sharpness (2 lines/mm) |
|---|---|---|---|---|
| Ex. 7 | 3 | 23 | 100 | 0.640 |
| Ex. 8 | 5 | 23 | 100 | 0.635 |
| Ex. 1 | 7 | 23 | 99 | 0.630 |
| Ex. 9 | 10 | 23 | 97 | 0.610 |

The results shown in Table 5 indicate that the radiographic intensifying screen of the invention gives a radiographic image having high sharpness and excellent sensitivity even if the thickness of the surface protective layer is varied.

EXAMPLE 10

(1) Production of Radiographic Intensifying Screens Having Different Phosphor Layers 1) The procedure of Example 1 was repeated except that the thickness of the phosphor layer after calender treatment was set at 80 μm, to prepare a radiographic intensifying screen (screen A, scattering length: 23 μm).

2) The procedure of Example 1 was repeated except that 50 g of the phosphor particles having the mean grain size of 2.0 μm and 200 g of those having the mean grain size of 6.2 μm were used (the chemical contents of the phosphor were not changed) and that the thickness of the phosphor layer after calender treatment was set at 120 μm, to prepare a radiographic intensifying screen (screen B, scattering length: 23 μm). The volume filling content of the phosphor in the phosphor layer was 72%.

3) The procedure of the above 2) was repeated except that the thickness of the phosphor layer after calender treatment was set at 95 μm, to prepare a radiographic intensifying screen (screen C, scattering length: 23 μm).

4) The procedure of Example 1 was repeated except that a double phosphor layer consisting of a lower layer (thickness after calender treatment: 80 μm) containing the phosphor particles having a mean grain size of 3.0 μm and an upper layer (thickness after calender treatment: 100 μm) containing those having a mean grain size of 6.2 μm was formed (the chemical contents of the phosphor were not changed), to prepare a radiographic intensifying screen (screen D, scattering length: 23 μm). The volume filling content of the phosphor in the phosphor layer was 70%.

5) The procedure of Example 1 was repeated except that a double phosphor layer consisting of a lower layer (thickness after calender treatment: 80 μm) containing the phosphor particles having a mean grain size of 3.0 μm and an upper layer (thickness after calender treatment: 240 μm) containing those having a mean grain size of 6.2 Am was formed (the chemical contents of the phosphor were not changed), to prepare a radiographic intensifying screen (screen E, scattering length: 23 μm).

(2) Production of Silver Halide X-ray Film (Film-1)

A "both-sided emulsion type" X-ray film was prepared in the same manner as described in Japanese Patent Provisional publication No. H7-219162 (sample 3 of Example 1). The subbing dye-I (described in the above publication) was applied in an amount of 45 mg per one surface. The light cross-over of the prepared film was measured by the method described in Example 1 of the above-mentioned publication, and found to be 6%. The chemical sensitization of the silver halide emulsion was adjusted so that the sensitivity and the tone might be the same as commercially available X-ray film (UR-2 [trade name], available from Fuji Photo film Co., Ltd.).

(3) Evaluation of Combination of Radiographic Intensifying Screen and X-ray Film The combinations of the radiographic intensifying screens A to E and the above X-ray film (Film-1) were evaluated in the manner described in Japanese Patent Provisional publication No. H7-219162 (Example 1). In addition to that, the combinations of the screens A to E and the above commercially available X-ray film (UR-2), and those of commercially available radiographic intensifying screens (HGM2 and HGH2 [trade name], available from Kasei Optonics Co., Ltd.) and the X-ray film (UR-2) were also determined.

The results are set forth in Table 6.

TABLE 6

| composition | front screen | back screen | film | sensitivity | sharpness (2 lines/mm) |
|---|---|---|---|---|---|
| No. 1 | A | B | Film-1 | 100 | 0.630 |
| No. 2 | A | B | UR-2 | 100 | 0.580 |
| No. 3 | C | D | Film-1 | 132 | 0.510 |
| No. 4 | C | D | UR-2 | 132 | 0.470 |
| No. 5 | HGM2 | HGM2 | UR-2 | 100 | 0.500 |
| No. 6 | HGH2 | HGH2 | UR-2 | 130 | 0.410 |
| No. 7 | C | E | Film-1 | 190 | 0.365 |
| No. 8 | C | E | UR-2 | 190 | 0.315 |

The results shown in Table 6 indicate that the composition consisting of the screens of the invention and an X-ray film of low cross-over gives an image of improved sharpness. The results also indicate that the combination of the screens of the invention and a commercially available X-ray film gives an image having excellent balance of sensitivity and sharpness.

EXAMPLE 11

1) Formation of a phosphor layer on the support having the light-reflecting layer The procedure of Example 1 was repeated except that 11 g of polyurethane binder resin was used to form a coating liquid for phosphor layer, to prepare a phosphor layer (thickness: 100 μm) on the support. The volume filling content of the phosphor and the weight ratio of binder/phosphor in the phosphor layer were 66% and 1/18.5, respectively.

2) Preparation of a surface protective layer

Anatase type titanium dioxide (P220 [trade name], available from Ishihara Industries Co., Ltd.) was added into melted polyethylene terephthalate (PET) resin in the amount of 3.5 wt. % (per PET resin). From thus prepared PET resin containing titanium dioxide, PET sheet (thickness: 70 μm) was formed by a known extrusion method. The formed PET sheet was biaxially oriented (by 3.4 times×3.4 times), and then heated to prepare a thin PET film (thickness: 6.0 μm) containing titanium dioxide.

The diffuse transmittance of the prepared film at the wavelength of 545 nm was measured to be found 78%. Thin PET films having various thickness were also prepared in the manner described above, and then the scattering length of the PET film was measured in the same manner as described in Example 1, and found to be 25 μm.

The film thus prepared was overlaid and fixed on the above phosphor layer with adhesive, to provide a surface protective layer (thickness: 6.0 μm). Thus, a radio-graphic intensifying screen of the invention was produced.

COMPARISON EXAMPLE 7

The procedure of Example 11 was repeated except that commercially available polyethylene terephthalate film (thickness: 6 μm, available from Toray Industries, Inc.) was used as the surface protective layer, to prepare a radiographic intensifying screen for comparison. The scattering length of the prepared screen was estimated to be more than 200 μm.

EXAMPLE 12

The procedure of Example 11 was repeated except that 15 g of polyurethane binder resin was used, to prepare a radiographic intensifying screen of the invention. The thickness of the phosphor layer, the volume filling content of the phosphor, and the binder/phosphor weight ratio in the phosphor layer were 110 μm, 60%, and 1/14, respectively.

COMPARISON EXAMPLE 8

The procedure of Example 12 was repeated except that commercially available polyethylene terephthalate film (thickness: 6 μm, available from Toray Industries, Inc.) was used as a surface protective layer, to prepare a radiographic intensifying screen for comparison.

EXAMPLE 13

The procedure of Example 11 was repeated except that 5.6 g of polyurethane binder resin and 1 g of epoxy binder resin were used, to prepare a radiographic intensifying screen of the invention. The thickness of the phosphor layer, the volume filling content of the phosphor and the weight ratio of binder/phosphor in the phosphor layer were 100 μm, 70% and 1/35, respectively.

COMPARISON EXAMPLE 9

The procedure of Example 13 was repeated except that commercially available polyethylene terephthalate film (thickness: 6 μm, available from Toray Industries, Inc.) was used as a surface protective layer, to prepare a radiographic intensifying screen for comparison.

EXAMPLE 14

The procedure of Example 11 was repeated except that 8 g of polyurethane binder resin was used, to prepare a radiographic intensifying screen of the invention. The thickness of the phosphor layer, the volume filling content of the phosphor and the binder/phosphor weight ratio in the phosphor layer were 105 μm, 68% and 1/24, respectively.

COMPARISON EXAMPLE 10

The procedure of Example 14 was repeated except that commercially available polyethylene terephthalate film (thickness: 6 μm, available from Toray Industries, Inc.) was used as a surface protective layer, to prepare a radiographic intensifying screen for comparison.

Measurement of Sharpness and Sensitivity (1) Measurement of sharpness

The sharpness was measured in the same manner as described above.

(2) Measurement of sensitivity

The sensitivity was measured in the same manner as described above, and relatively shown so that the value of Example 14 might be 100.

The results are set forth in Table 7.

TABLE 7

| screen | scattering length (μm) | binder/phosphor (wt.) | sensitivity | sharpness (2 lines/mm) |
|---|---|---|---|---|
| Ex. 11 | 25 | 1/18.5 | 98 | 0.605 |
| Ex. 12 | 25 | 1/14 | 95 | 0.580 |
| Ex. 13 | 25 | 1/35 | 100 | 0.635 |
| Ex. 14 | 25 | 1/24 | 100 | 0.635 |
| C. Ex. 7 | above 200 | 1/18.5 | 100 | 0.580 |
| C. Ex. 8 | above 200 | 1/14 | 99 | 0.570 |
| C. Ex. 9 | above 200 | 1/35 | 100 | 0.590 |
| C. Ex. 10 | above 200 | 1/24 | 100 | 0.590 |

The results shown in Table 7 indicate the following facts. Even if the ratio of binder/phosphor in the phosphor layer varies within the range of less than 1/12, each radiographic intensifying screen of the invention gives a radiographic image having improved sharpness without lowering the sensitivity, as compared with that given by each conventional screen having a transparent surface protective layer. Further, the screen of low binder/phosphor ratio gives good sharpness and sensitivity, and hence the ratio of binder/phosphor is preferred to be small (in other wards, the binder is preferred to be used in a small amount) in the invention.

EXAMPLE 15

The procedure of Example 1 was repeated except that the thickness of the surface protective layer was set at 2 μm, to prepare a radiographic intensifying screen of the invention.

COMPARISON EXAMPLE 11

The procedure of Example 1 was repeated except that titanium dioxide was not used to form a surface protective layer having the thickness of 2 μm, to prepare a radiographic intensifying screen for comparison.

COMPARISON EXAMPLE 12

The procedure of Example 1 was repeated except that titanium dioxide was not used to form a surface protective layer having the thickness of 5 μm, to prepare a radiographic intensifying screen for comparison.

Measurement of Sharpness, Sensitivity, Stain Resistance and Abrasion Resistance (1) Measurement of sharpness The sharpness was measured in the same manner as described above.

(2) Measurement of sensitivity

The sensitivity was measured in the same manner as described above, and relatively shown so that the value of Comparison Example 1 might be 100.

(3) Measurement of stain resistance 1 cc of screen cleaner (available from Fuji Photo film Co., Ltd.) was evenly applied and dried on the sample screen (size: 16 cm×16 cm). The thus treated sample screen and a silver halide X-ray film (UR-1 [trade name], available from Fuji Photo film Co., Ltd.) were stored at 25° C., 84 %RH for 3 hours. After that, the sample screen was placed on the X-ray film so that the surface protective layer would be in contact with the film, and then pressed for fixation. The laminated screen and film were stored at 40° C. for 24 hours.

The screen was then peeled off from the film, and the stains caused with dyes transferred onto the protective layer from the X-ray film were observed by sight. According to the observation, the surface protective layer of each sample was classified into the following three grades:

AA: not stained,
BB: slightly stained, but usable,
CC: stained too much to use.

(4) Measurement of abrasion resistance

The sample screen was rubbed 10,000 times with a UR-1 X-ray film (the rubbing film was renewed at regular intervals), and then the surface protective layer thus treated was observed by sight. According to the observation, the surface protective layer of each sample was classified into the following five grades:

AA: not abraded,
BB: hardly abraded and presumed to be usable even after rubbed 40,000 times,
CC: slightly abraded and presumed to be usable even after rubbed 20,000 times,
DD: abraded, but usable until rubbed 10000 times,
EE: abraded so much that the protective layer was completely worn out and that the bared phosphor layer was stained.

The results are set forth in Table 8.

TABLE 8

| scattering length (μm) | binder | thickness (μm) | sensitivity | sharpness (2 lines/mm) |
|---|---|---|---|---|
| (Example 15) | | | | |
| 23 | fluoro* | 2 | 100 | 0.645 |
| stain resistance: BB | | abrasion resistance: DD | | |
| (Example 7) | | | | |
| 23 | fluoro* | 3 | 100 | 0.640 |
| strain resistance: AA | | abrasion resistance: CC | | |
| (Example 8) | | | | |
| 23 | fluoro* | 5 | 100 | 0.635 |
| stain resistance: AA | | abrasion resistance: BB | | |
| (Example 1) | | | | |
| 23 | fluoro* | 7 | 99 | 0.630 |
| stain resistance: AA | | abrasion resistance: AA | | |
| (Example 9) | | | | |
| 23 | fluoro* | 10 | 97 | 0.610 |
| stain resistance: AA | | abrasion resistance: AA | | |
| (Comparison Example 11) | | | | |
| above 200 | fluoro* | 2 | 100 | 0.635 |
| stain resistance: BB | | abrasion resistance: DD | | |
| (Comparison Example 12) | | | | |
| above 200 | fluoro | 5 | 100 | 0.600 |
| stain resistance: AA | | abrasion resistance: CC | | |
| (Comparison Example 1) | | | | |
| above 200 | fluoro* | 7 | 100 | 0.590 |
| stain resistance: AA | | abrasion resistance: BB | | |

The results shown in Table 8 indicate that the present invention is very effective in the screen having a thick protective layer. The conventional screen having a thick protective layer gives a radiographic image of poor sharpness, while the screen of the invention having that of the same thickness gives relatively high sharpness. The results further suggests that the thick surface protective layer gives high stain resistance and high abrasion resistance. Therefore, the screen of the invention having the protective layer of enough thickness to keep sufficient resistance against stain and abrasion can give a radiographic image of high sharpness without lowering sensitivity.

The results shown in Table 8 also reveal that the light-scattering particles do not lower the stain resistance but improve the abrasion resistance of the surface protective layer containing fluorocarbon resin.

EXAMPLE 16

10 g of cellulose acetate (acetylation degree: about 56%) and 0.3 g of anatase type titanium dioxide (A220 [trade name], available from Ishihara Industries Co., Ltd.) were added into methyl ethyl ketone, and mixed to prepare a coating liquid for protective layer. After that, the procedure of Example 1 was repeated except that the prepared coating solution was used to prepare a surface protective layer of the thickness of 6.5 μm, to prepare a radiographic intensifying screen. The content of titanium dioxide in the surface protective layer was 3 wt. %, and the scattering length of the prepared screen was 28 μm.

COMPARISON EXAMPLE 13

The procedure of Example 16 was repeated except that titanium dioxide was not used to form a surface protective layer, to prepare a radiographic intensifying screen for comparison.

EXAMPLE 17

The procedure of Example 14 was repeated except that the thickness of the surface protective layer was set at 4 μm, to prepare a radiographic intensifying screen of the invention.

Measurement of Sharpness, Sensitivity, Stain Resistance and Abrasion Resistance
(1) Measurement of sharpness
The sharpness was measured in the same manner as described above.
(2) Measurement of sensitivity
The sensitivity was measured in the same manner as described above, and relatively shown so that the value of Comparison Example 10 might be 100.
(3) Measurement of stain resistance
The stain resistance was measured in the same manner as described above.
(3) Measurement of abrasion resistance
The abrasion resistance was measured in the same manner as described above.
The results are set forth in Table 9.

TABLE 9

| scattering length (μm) | binder | thickness (μm) | sensitivity | sharpness (2 lines/mm) |
|---|---|---|---|---|
| (Example 16) | | | | |
| 28 | cel.ac.* | 6.5 | 100 | 0.630 |
| stain resistance: BB | | abrasion resistance: BB | | |
| (Example 17) | | | | |
| 25 | PET* | 4 | 100 | 0.640 |
| stain resistance: AA | | abrasion resistance: AA | | |
| (Example 14) | | | | |
| 25 | PET* | 6 | 100 | 0.635 |
| stain resistance: AA | | abrasion resistance: AA | | |
| (Comparison Example 13) | | | | |
| above 200 | cel.ac.* | 6.5 | 100 | 0.585 |
| stain resistance: BB | | abrasion resistance: BB | | |
| (Comparison Example 10) | | | | |
| above 200 | PET* | 6 | 100 | 0.590 |
| stain resistance: AA | | abrasion resistance: AA | | |
| (Comparison Example 1) | | | | |
| above 200 | fluoro* | 7 | 100 | 0.590 |
| stain resistance: AA | | abrasion resistance: BB | | |

Remark*) "cel.ac." and "PET" mean cellulose acetate and polyethylene terephthalate, respectively.

The results shown in Table 9 indicate that the radiographic intensifying screen of the invention gives a radiographic image of excellent sharpness without lowering the sensitivity and the resistance against stain and abrasion even if cellulose acetate or polyethylene terephthalate is used as a binder of the surface protective layer.

What is claimed is:

1. A radiographic intensifying screen comprising a support, a phosphor layer containing phosphor and a surface protective layer overlaid in order, wherein the surface protective layer shows a scattering length in the range of 5 to 80 μm, said scattering length being measured at main wavelength of light emitted from the phosphor.

2. The radiographic intensifying screen of claim 1, wherein the scattering length is in the range of 10 to 70 μm.

3. The radiographic intensifying screen of claim 1, wherein the surface protective layer contains light-scattering fine particles having a mean grain size of 0.1 to 1 μm and a refractive index of not less than 1.6.

4. The radiographic intensifying screen of claim 1, wherein the surface protective layer contains light-scattering fine particles having a mean grain size of 0.1 to 1 μm and the refractive index of not less than 1.9.

5. The radiographic intensifying screen of claim 1, wherein the surface protective layer contains light-scattering fine particles comprising at least one material selected from the group consisting of zinc oxide, zinc sulfide, titanium dioxide and lead carbonate, and the particles have a mean grain size of 0.1 to 1 μm.

6. The radiographic intensifying screen of claim 1, wherein the surface protective layer comprises a binder containing fluorocarbon resin and light-scattering fine particles dispersed therein.

7. The radiographic intensifying screen of claim 1, wherein the surface protective layer comprises a binder containing polyester resin and light-scattering fine particles dispersed therein.

8. The radiographic intensifying screen of claim 1, wherein the surface protective layer has a thickness of 2 to 12 μm.

9. The radiographic intensifying screen of claim 1, wherein the surface protective layer has a thickness of 3 to 9 μm.

10. The radiographic intensifying screen of claim 1, wherein the phosphor contained in the phosphor layer has the following formula:

$$M_2O_2X:Tb$$

wherein M is at least one element selected from the group consisting of Y, Gd and Lu, and X is at least one element selected from the group consisting of S, Se and Te.

11. The radiographic intensifying screen of claim 1, wherein a light-reflecting layer is provided between the support and the phosphor layer.

12. The radiographic intensifying screen of claim 1, wherein the phosphor layer comprises a binder and the phosphor dispersed therein, and the weight ratio of the binder to the phosphor is in the range of 1/12 to 1/200.

13. The radiographic intensifying screen of claim 1, wherein the phosphor layer comprises a binder and the phosphor dispersed therein, and the weight ratio of the binder to the phosphor is in the range of 1/16 to 1/100.

* * * * *